Patented July 8, 1941

2,248,289

UNITED STATES PATENT OFFICE 2,248,289

PROCESS OF PRODUCING PIES

Martha Thal, Chicago, Ill.

No Drawing. Application March 25, 1939,
Serial No. 264,177

5 Claims. (Cl. 99—92)

The invention relates to the process of producing pies, and the instant application is a continuation in part of my prior copending application Serial No. 169,281, filed October 15, 1937.

In the art of commercially producing pies, if fruit in season is used as filler, artificial syrup is added, so that even upon delayed consumption, a juicy pie is available. The artificial syrup, however, does not possess the taste and palatability of a home made pie, since there, by the mere addition of sugar, a natural syrup is formed which possesses the taste, aroma and flavor of the natural fruit.

By the term "home made" as used herein, I refer to a pie that is prepared with fresh fruit and immediately baked; the procedure followed by the housewife in her kitchen. In producing such a pie, the crust is prepared and laid; the fresh fruit is sliced or placed thereon; sugar, spices, etc. added, and the pie is placed in the oven and baked. By this process the baking is begun before any substantial mingling of fruit juices and sugar occurs; while the major portion of the sugar is still dry. The oven heat acts simultaneously on the fruit and sugar, hardening the fruit cells and preventing excessive leakage of fruit juice into the sugar. Enough juice, however, passes to the sugar to form a thick natural syrup; rendering the pie juicy when eaten freshly baked. The natural flavor of the retained juices sealed in the hardened cells imparts to the pie the flavor of the fresh fruit.

The main object is to commercially produce fruit or other pies for the housewife to bake in her own kitchen at any time, whether in or out of season, that will have the character of a freshly made home made pie.

It is a further object of the invention to produce commercially unbaked or raw pies, which may be baked by the housewife without inconvenience and with very little effort.

A further object aims at providing a novel process for effectively preserving fillers for pies in the form in which it is utilized for pie baking.

A still further object constitutes the provision of unbaked pies having a preserved filler and treated to be preserved, for any length of time, until used.

Other and equally important objects will become apparent from a perusal of the invention, which comprises the steps of a novel process, described in the following specification, and particularly pointed out in the claims forming a part thereof.

In commercially producing home made pies, fruit in season is used, identically as the housewife uses it when making pies in her home.

To elucidate the procedure, first the crust is made, then the bottom crust is placed in the pie pan, whereupon the fruit is sliced onto the bottom crust, flour added as a thickener, and the desired quantity of sugar, flavors or spices are added. Subsequently the top crust is applied, and the pie is ready for baking.

In accordance with my novel process, the unbaked pie is immediately after preparation subjected to a quick freezing temperature, ranging between −10° to −45° F., for a period of from ten minutes to two and a half hours. The pie crusts serve as an insulator and protect the fruit content against deterioration and dehydration.

Thereafter, the pie is wrapped and placed in cold storage, at a temperature ranging from +5° to 0° F., to be stored until its consumption is desired.

Then the housewife thaws the frozen pie by subjecting it to room temperature long enough to partially soften the fruit, whereupon the pie is immediately baked.

The purpose of freezing the unbaked pie is to preserve the home made quality. When the housewife bakes a pie which she has made herself, the heat reaches the sugar and the fruit at the same time. This heating hardens the cell structure of the fruit, and prevents excessive leakage of the fruit juice into the sugar. However, sufficient leakage occurs to form a thickened syrup. This produces a juicy pie, when eaten freshly baked.

By the freezing quickly of the unbaked pie, before the fruit juice oozes into the sugar, the cell structure is kept intact, and the sugar remains nearly dry. When subsequently subjected to baking by the housewife, the same process of hardening the cell structure of the fruit and the formation of a thickened syrup occur, so that a juicy pie is available irrespective of when the actual baking and consumption takes place.

In order to commercially produce home made pies, when fresh fruit is out of season, I have invented a process for making a pie filler which is available at any time of the year and, when used, has the same characteristics as to taste, aroma, flavor and cell structure as the pie filler of the pie made by the housewife in season.

It is the common practice, in commercial pie baking, to use frozen or otherwise preserved fruit when fruit is out of season.

When frozen fruit is used, it is thawed and then "processed." Processing is known as the adding of a thickener, syrup, sugar, flavor, spices and sometimes artificial coloring.

Then the fruit is ladled or weighed into the pie crust and a top crust is applied, and the pie is ready for the oven. The above process produces pie which will remain juicy a good many hours until consumed.

Upon examining this pie, it is found that much of the juice has escaped from the cell structure of the fruit into the syrup.

In order to make a pie consistent with the home made quality, I have overcome the necessity of thawing frozen fruit by freezing fresh fruit into a "pie filler mold," in such a manner that the cell structure of the fruit is kept intact.

The pie filler is cast in a mold or filler pan, care being taken that the filler fits within the space afforded by the crusts of the pie. To this end, the mold pan of the filler should have a top and bottom diameter one quarter of an inch smaller than the corresponding diameter of the pie pan, and a depth of one-eighth of an inch less than the depth of the pie pan. If a tin mold is used, proper lacquer, suitable for the particular type of fruit employed, to guard against unfavorable reactions between the fruit and the metal, should be used.

In order to pack fruit by freezing, so as to preserve the cell structure, such freezing processes as have been found best suited to each type of fruit are to be employed within a temperature range from +15° F. to −45° F.

In the interest of the proper preservation of the fruit filler, sugar or syrup may be added at the time of packing.

Prior to freezing, the weight of the filler and mold is determined and recorded. After freezing, the frozen filler is left in the filler pan, placed in a container suitable for storage purposes and, thereafter, placed in cold storage at a temperature below +5° F., for later use when the making of the pie is desired.

When the frozen filler is removed from the cold storage, in order to produce the unbaked pie, the filler and pan are weighed and the weight recorded if evaporation has taken place. The filler is then inverted and placed on a flat plate under room temperature to enable the filler to thaw out just sufficiently to drop onto the plate under gravity. Thereafter, the further steps in making the pie must be carried out with the utmost speed so as to prevent further and unnecessary thawing of the filler.

If evaporation has occurred, sufficient water by weight must be added at this time. Sugar and other dry ingredients are to be chilled to zero temperature to eliminate the influence of the comparatively warmer crusts, which have about room temperature.

As soon as the unbaked pie is finished, it is to be immediately placed in a freezer for quick freezing, at a temperature of about −10° F.

It has been demonstrated that the proper freezing of the crust is of great importance, and that the best results are obtained at a temperature ranging between −5° to −10° F. When the crust freezes too slowly, ice crystals form which, upon thawing, produce a soggy crust. A lower temperature for freezing pie, at this stage, is undesirable, as it is likely to cause rupture in fruit cells and leakage of the juices will occur.

When pie is improperly frozen, a dry or "soupy" pie may result. The pie, after proper freezing, is wrapped and placed in cold storage at zero temperature for subsequent use.

Where the unbaked pie is to be stored, for a period not to exceed ninety days, any type of commercial shortening may be employed. For longer periods, however, it has been found that if hydrogenized vegetable oil is used as a shortening for pie crusts, the same keep best.

Experiments have further established that the pie crusts, comprising twenty parts of water for each one hundred parts by weight of flour, are capable of withstanding the evaporation that occurs during freezing and during long period storing.

It is, of course, within the scope of the invention to employ other types of crusts than pie crusts, also to make pies with one crust only, and to make pies in other shapes than round ones, such as rectangular, square and the like. Fillers may also be made to fit shapes other than round ones, and may be of meat, fish, custard, cream, or any other substance applicable to the making of pies.

The invention may be also applied to pies made with other fillers, such as meat, fish, cream, custards, cheeses, and other food products or their mixtures, such as in the making of mince or pumpkin pie. Where whole milk is employed, to insure its proper keeping, it must be properly pasteurized or sterilized.

For making a meat pie filler, the meat and the vegetables are cooked separately until they are well cooked and tender, but not overcooked. The gravy is thickened to three quarters of the normal thickness to allow for evaporation in freezing and baking. Then the pie pan is filled with the mixture, allowing room for the top crust.

Before the crust is mounted, the meat mixture must be air cooled to from +50° F. to +65° F. This is best accomplished by contact with coils or by being subjected to the influence of a cooling fan.

Now the filler is ready for crust. As soon as the crust is mounted, it is placed in a freezer at a temperature ranging between −5° F. to −10° F. Thereafter, the meat pie is wrapped and stored.

Whenever any cooked pie filler is made, it is to be cooled to a temperature ranging between +50° to +65° F., before mounting the crust or freezing.

While the invention discloses the preferred method of producing pies, numerous changes and alterations may be made without departing from the spirit of the invention.

I, therefore, do not limit myself to the present sequence of steps nor to the particular temperatures, but wish to include all changes, variations and modifications constituting departures, within the scope of the invention, as defined in the appended claims.

I claim:
1. The process of commercially producing home-made pies out of season, including the steps of using a filler which has been subjected to quick freezing and kept in cold storage, thawing the filler until separable from the mold, applying the crusts to the filler, subjecting the unbaked pie to quick freezing, and subsequently placing the pie in cold storage for future use.

2. The process of commercially producing home-made pies out of season, including the steps of using a filler which has been subjected to quick freezing and kept in cold storage, adding water thereto to compensate evaporation, thawing the filler until separable from the mold, applying the crusts to the filler, subjecting the unbaked pie to quick freezing, and subsequently placing the pie in cold storage for future use.

3. The process of commercially producing home-made pies out of season, including the steps of using a filler which has been subjected to quick freezing and kept in cold storage, adding water thereto to compensate evaporation and adding sugar and dry ingredients chilled to zero temperature, thawing the filler until separable from the mold, applying the crusts to the filler, subjecting the unbaked pie to quick freezing, and subsequently placing the pie in cold storage for future use.

4. The process of preparing fresh fruit pie for storage in an unbaked condition over an extended period of time without change in the state of its initial preparation, which comprises; assembling in final form the unbaked crust, a filler of fresh fruit previously frozen into the shape of its final form, and chilled sugar, and, before the filler begins to thaw, quickly freezing the assembly and thereafter storing it at a temperature maintained below freezing.

5. In the preparation of pies having a filler of uncooked fruit with added sugar prior to baking, the method of maintaining a pie over an extended period of time in exactly its condition of initial preparation prior to baking, which comprises; assembling in final form the filler and unbaked crust, and, while the sugar is still dry, rapidly freezing the unbaked pie to crystallize the fruit juices, and thereafter maintaining the pie, until desired for baking, at a temperature below freezing.

MARTHA THAL.